(12) United States Patent
Fouché

(10) Patent No.: US 6,694,923 B1
(45) Date of Patent: Feb. 24, 2004

(54) PET HARNESS WITH QUICK CONNECT STAND-UP LEASH

(76) Inventor: Brandon K. Fouché, 1848 W. Jefferson Blvd., Los Angeles, CA (US) 90018

( * ) Notice: Subject to any disclaimer, the term of this patent is extended or adjusted under 35 U.S.C. 154(b) by 0 days.

(21) Appl. No.: 10/459,973

(22) Filed: Jun. 11, 2003

(51) Int. Cl.[7] .............................................. A01K 27/00

(52) U.S. Cl. ...................................................... 119/792

(58) Field of Search ................................ 119/769, 772, 119/792, 795, 797, 798, 856, 907

(56) References Cited

U.S. PATENT DOCUMENTS

| | | | | |
|---|---|---|---|---|
| 2,826,172 A | * | 3/1958 | Buckle et al. ............... | 119/792 |
| 6,314,915 B1 | * | 11/2001 | Pope et al. .................. | 119/712 |
| 6,367,424 B1 | * | 4/2002 | Higham ....................... | 119/850 |

FOREIGN PATENT DOCUMENTS

GB 2274135 * 7/1994

* cited by examiner

Primary Examiner—Thomas Price
(74) Attorney, Agent, or Firm—Albert O. Cota

(57) ABSTRACT

A harness assembly (24 surrounding an animal's body around the neck, across the back, upon the underside and around the animal's chest. The harness assembly (24) includes a shoulder connecting member (28) having an upward extending, quick connect plug (34); a neck band (46) encircling the animal's neck and that is attached to the shoulder connecting member (28); a body band (50) encircling the animal behind its front legs and that attaches to the shoulder connecting member (28); and a chest member (54) connected to the neck and body. A stand-up leash (64), which is attached to the plug (34), normally remains in an upright position permitting a person walking the animal to comfortably grasp the leash (64) with a hand grip (88). A quick connect coupling (74) interfaces with the plug (34) for removing or replacing the stand-up leash (64) from the harness assembly (24). The leash (64) also has an extension (90) for lengthening which permits the animal increased freedom of movement.

18 Claims, 5 Drawing Sheets

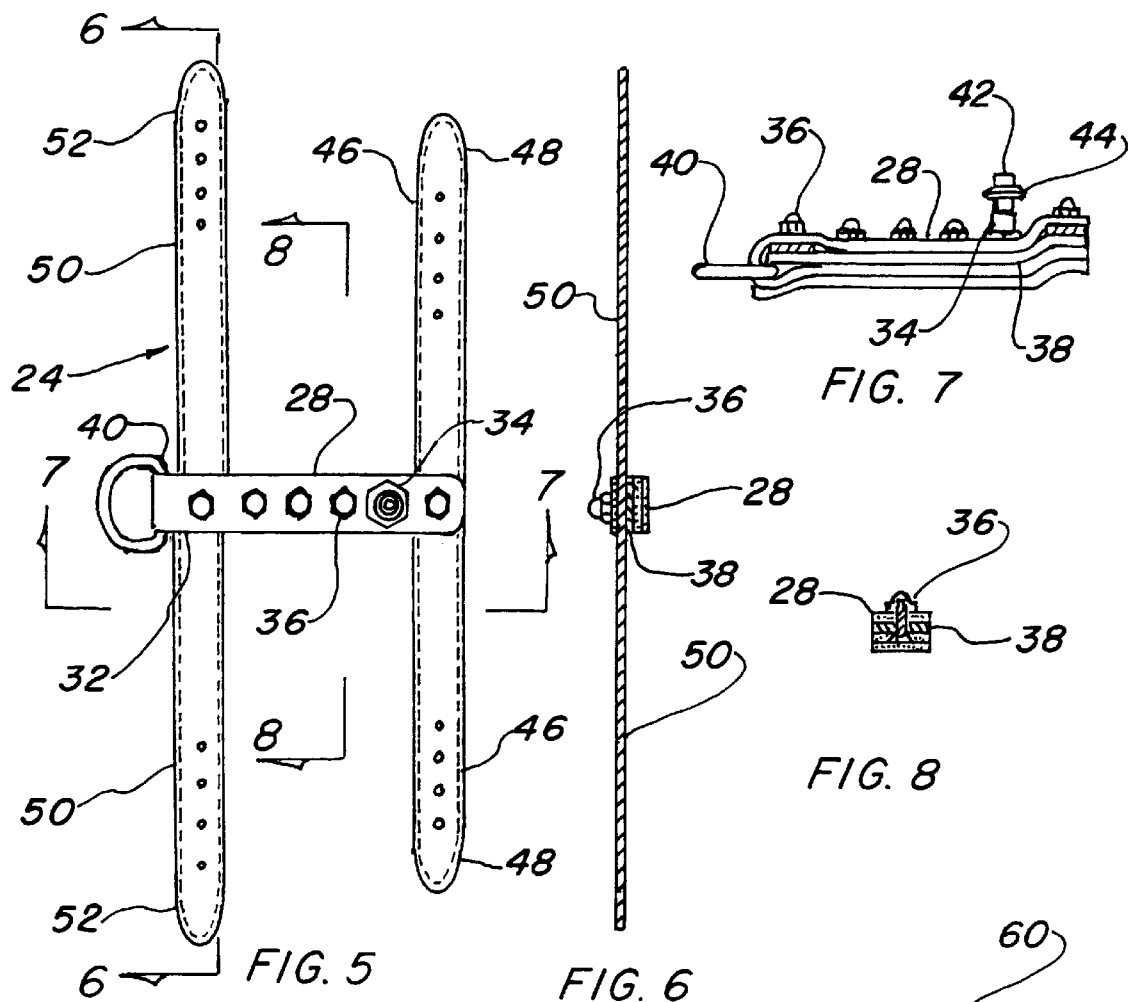
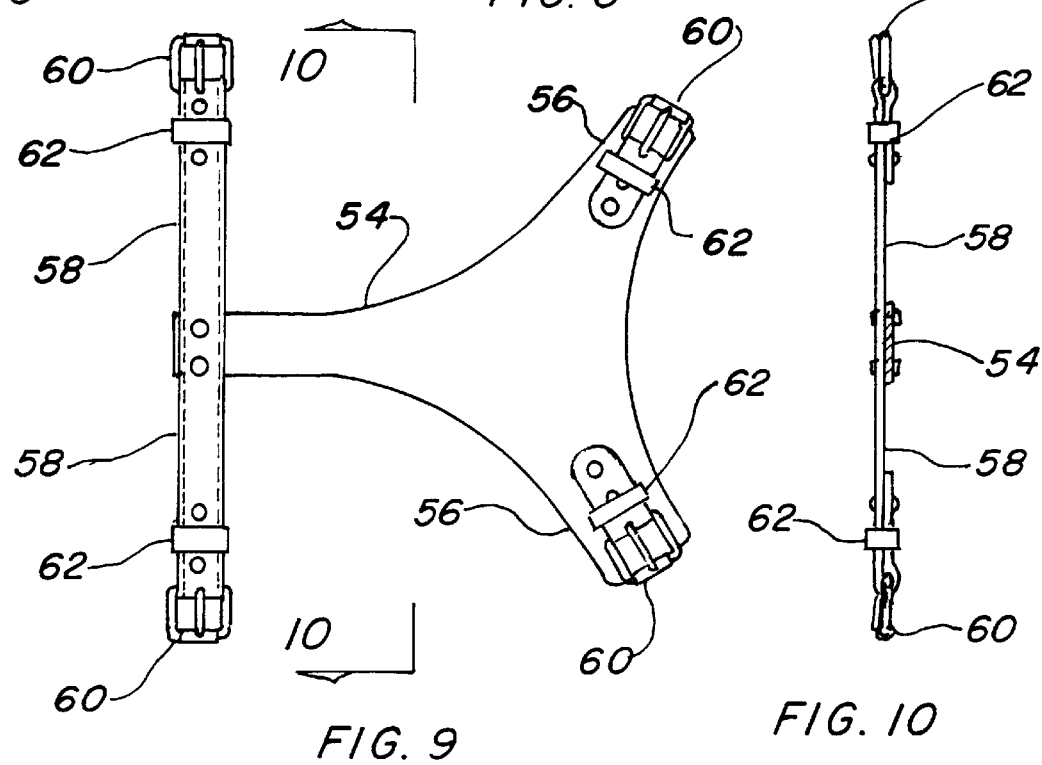

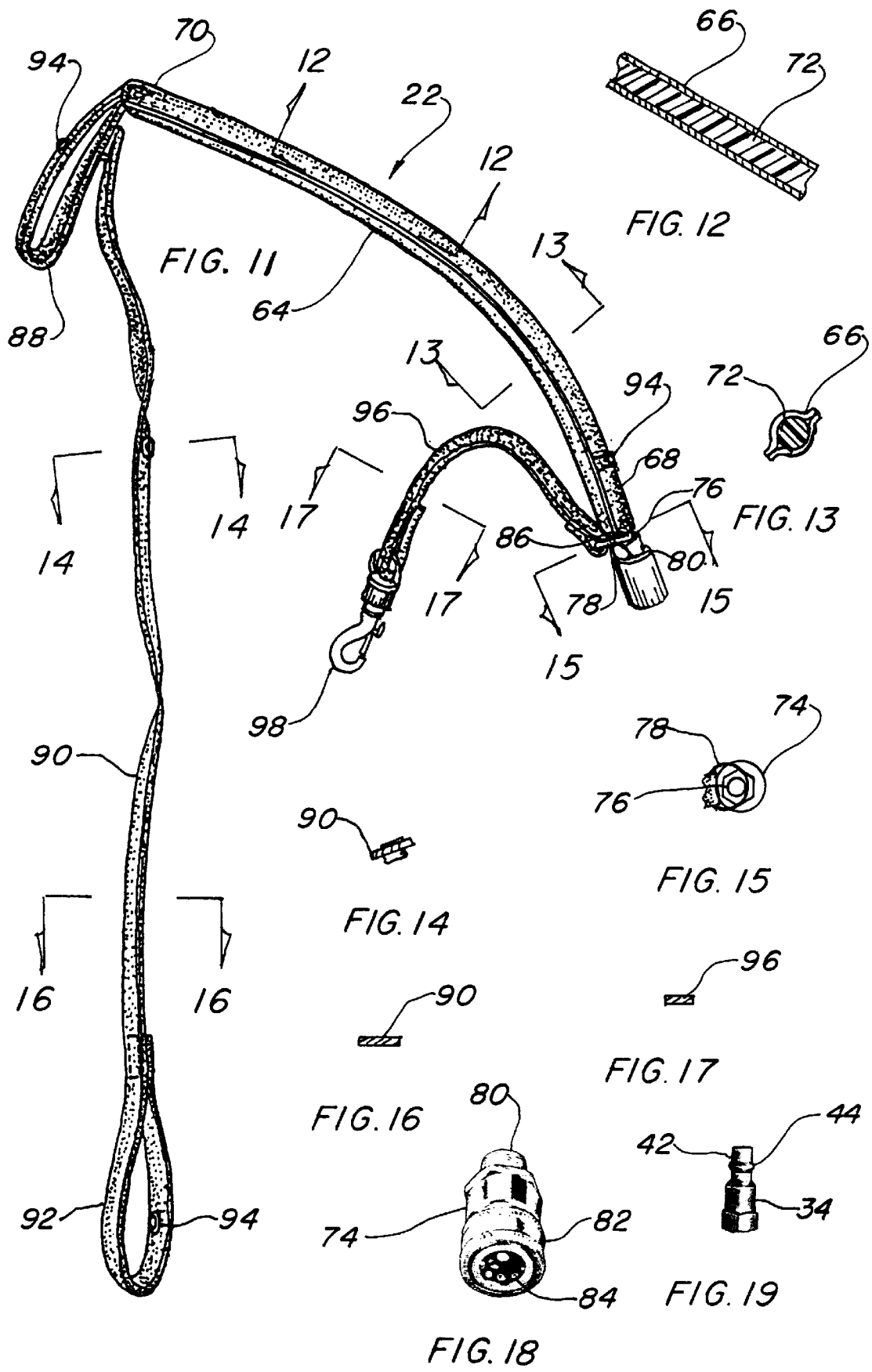

PET HARNESS WITH QUICK CONNECT STAND-UP LEASH

TECHNICAL FIELD

The invention generally relates to pet harnesses, and more specifically to a dog harness having a combined, quick connect stand-up leash along with an attached extended leash.

BACKGROUND ART

Previously, many types of harnesses have been used to provide an effective means for controlling a pet, such as a dog, while a person walks the pet.

A search of the prior art did not disclose any patents that possess the novelty of the instant invention, however the following U.S. patents are considered related:

| U.S. Pat. No. | Inventor | Issue Date |
| --- | --- | --- |
| 5,531,187 | Ward | Jul. 2, 1996 |
| 5,676,093 | Sporn | Oct. 14, 1997 |
| 5,713,309 | Holt Jr. | Feb. 3, 1998 |
| 5,893,339 | Liu | Apr. 13, 1999 |
| 6,161,505 | Noguero | Dec. 19, 2000 |
| 6,167,844 | Cantrell et al. | Jan. 2, 2001 |

Ward in U.S. Pat. No. 5,531,187 teaches a harness having four sets of straps that extend around a dog's torso. One strap set loops around the dog's neck and another around its hind quarters with two strap sets in between. A longitudinally-extending upper strap and a flexible truss member including a pair of strips of unequal length are coupled together by a D-ring connector. When a dog is suspended in the harness by a strap attached to the D-ring connector, the flexible truss supports each of the strap sets evenly along the length of the harness.

U.S. Pat. No. 5,676,093 issued to Sporn is for a leash-controlled dog harness that inhibits a dog from straining against a leash while a person walks the dog. The harness has a shoulder junction with a pair of slide openings and a crotch leading to the sensitive pit located intermediate the dog's forelegs. A pair harness straps form the chest junction and pass through the foreleg crotches and though the opening in the shoulder junction to terminate in a link, thereby coupling the harness to the leash.

Holt Jr. in U.S. Pat. No. 5,713,309 discloses an animal restraint and control harness having a cord portion, adjustment slides, a control slide and a leash attachment eyelet. The cord portion is threaded through the adjustment slides and the control slide, as well as through the leash attachment eyelet to form loop and bridge portions. A second loop portion cinches around the animal'chest causing the animal to cease any straining behavior which causes cinching discomfort.

Liu in U.S. Pat. No. 5,893,339 teaches a dog collar that is mounted on a dog's neck and a girth having two ends that passes around the dog's body. A retainer is moved between the girth's second end and a metal ring that is located at the collar and is secured at a desired location. A drag rope is connected to the girth's second end, and a belt is connected between the collar and the girth which is retained between the dog's two front legs.

U.S. Pat. No. 6,161,505 issued to Noguero is for a flexible tether that connects a collar to a harness, with a portion of the tether located between the collar and the harness available to be held for restraining an animal wearing the collar and the harness.

Cantrell et al. in U.S. Pat. No. 6,167,844 discloses a training and control collar for an animal which includes a body band that is fitted around an animal's body. A neck piece is attached to the body band that fits around the animal's neck, and a chest piece attaches to both the neck piece and the body band. The chest piece restricts the animal's neck and spreads the force applied from the leash to the animal's upper body in addition to the animal's neck.

DISCLOSURE OF THE INVENTION

Pets such as dogs must often be tethered to a person, particularly when leaving a domicile, in order for the person to maintain control of the pet. A myriad of different types of harnesses have been developed and utilized for this purpose. The harness vary from a simple unitary collar to complex harnesses with restraining means, plus connections to the harness or collar in the form of a leash. Control of the pet is of prime importance when walking, and restraint should be convenient and easy for the person to accomplish. Therefore, the primary object of the invention is to provide means for completely controlling of a dog by utilizing a semi-rigid stand-up leash that is connected in a removable manner directly to a robust harness. The invention provides control by permitting the dog's owner to keep the dog in close contact by using the stand-up leash, which positions a gripping surface in close proximity to the owners hand. If the dog is temporarily released, the leash is easy to re-grasp as it remains in an upward "stand-up" position.

An important object of the invention is that the leash protects the owner from sudden lunges by the dog, which cause the dog to break free and drag a conventional leash across the ground, whereas the stand-up leash remains securely attached to the harness and accessible to the owner.

Another object of the invention is realized since the leash never touches the ground, even when the animal is lying down, as its semi-rigid characteristic keeps the leash in an upward-extended position.

Still another object of the invention is in the construction of the stand-up leash, as it has a swiveling capability such that the dog does not get tangled when it turns around while the owner is holding onto the leash. The swiveling ability is important because when a dog is active and moves around frequently, the owner must continually let go with one hand and typically unwind the leash with both hands.

Yet another object of the invention is that the quick-connect stand-up leash is easily disconnected from the harness by simply lifting up on an outer connector sleeve and pulling the connector from the plug retained on the harness. This type of connection is extremely easy to use and is readily connected by reversing the procedure. As an additional feature, a safety strap may be added between the stand-up leash and the harness. The safety strap utilizes a conventional snap hook that is connected to a D-ring on the harness. The safety strap may also be used to clip the snap hook on the owner's apparel without having to hold onto the leash itself.

A further object of the invention is that a leash extension is included as an integral part of the stand-up portion of the leash. The leash extension can be easily unsnapped from the hand grip and leash body to extend the leash to double its length. This additional feature allows the dog to walk further away while remaining under complete control of the owner. The extended leash is easily gripped by the owner, as it also includes a hand grip at its distal end.

A final object of the invention is the ability of the harness to be easily adjusted to fit various sizes of dogs while resting comfortably between the dog's shoulders without interfering with the dog's normal activity These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 5 is an elevation plan view of the harness shoulder connecting member with neck and body bands attached.

FIG. 6 is a cross-sectional view taken along lines 6—6 of FIG. 5.

FIG. 7 is a cross-sectional view taken along lines 7—7 of FIG. 5.

FIG. 8 is a cross-sectional view taken along lines 8—8 of FIG. 5.

FIG. 9 is an elevation plan view of the chest member with neck and body bands attached.

FIG. 10 is a cross-sectional view taken along lines 10—10 of FIG. 9.

FIG. 11 is a partial isometric view of the stand—up leash disconnected from the harness in its preferred embodiment.

FIG. 12 is a cross-sectional view taken along lines 12—12 of FIG. 11.

FIG. 13 is a cross-sectional view taken along lines 13—13 of FIG. 11.

FIG. 14 is a cross-sectional view taken along lines 14—14 of FIG. 11.

FIG. 15 is a cross-sectional view taken along lines 15—15 of FIG. 11.

FIG. 16 is a cross-sectional view taken along lines 16—16 of FIG. 11.

FIG. 17 is a cross-sectional view taken along lines 17—17 of FIG. 11.

FIG. 18 is a front elevation view of the quick-connect coupling member completely removed from the invention for clarity.

FIG. 19 is a front elevation view of the quick-connect plug completely removed from the invention for clarity.

BEST MODE FOR CARRYING OUT THE INVENTION

Figure 1:
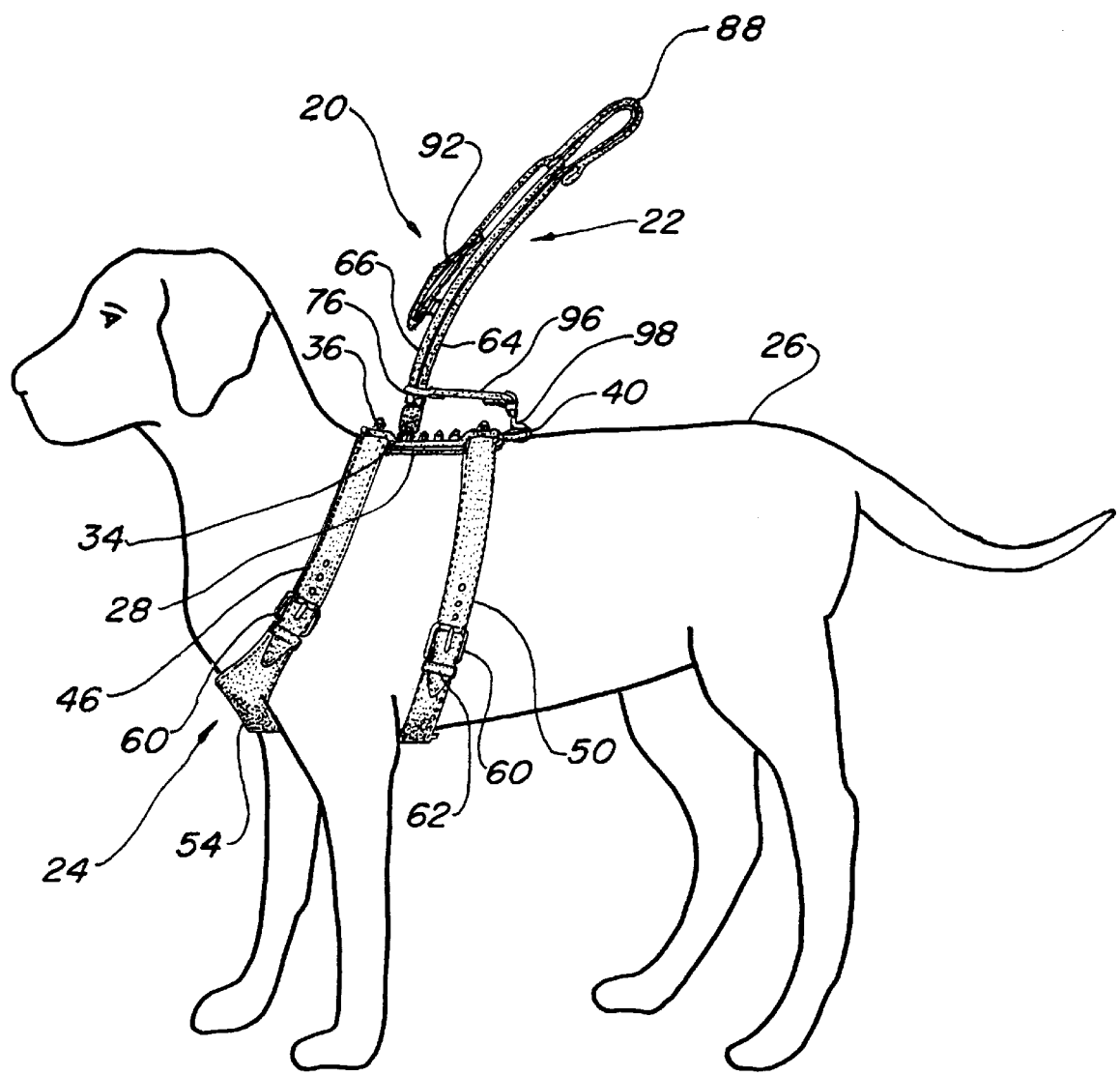
FIG. 1 is a partial isometric view of the pet harness with quick-connect stand-leash, with the extended leash folded in its stowed position and the invention strapped to a dog.

The best mode for carrying out the invention is presented in terms of a preferred embodiment. The preferred embodiment, as shown in FIGS. 1 through 19, is comprised of an animal harness 20 that includes a connectable stand-up leash assembly 22 that customarily remains attached in an upright position, as illustrated in FIG. 1.

The animal harness 20 consists of a harness assembly 24 that surrounds the animal's body around its neck, across its back, on its underside and around the animal's chest. FIG. 1 illustrates such an animal, which is typically a dog 26, however other pets of similar size are to be included in the utility of the invention. For purpose of this specification, a dog will be the animal/pet that is referred to.

The harness assembly 24 consists of a shoulder connecting member 28 that rests on the dog's back and is defined as having a forward end 30 and a rearward end 32, with a quick connect plug 34, which extends angularly upward adjacent to the forward end 30.

The shoulder connecting member 28 utilizes a multi-layer type of construction employing a number of stacked layers, with each layer the same width and attached together with fasteners 36, as illustrated in FIGS. 2, 4, and 5–8. This type of construction creates a structurally sound and sturdy member which is capable of retaining its shape when subjected to forces created by a dog's movements.

Figure 4:
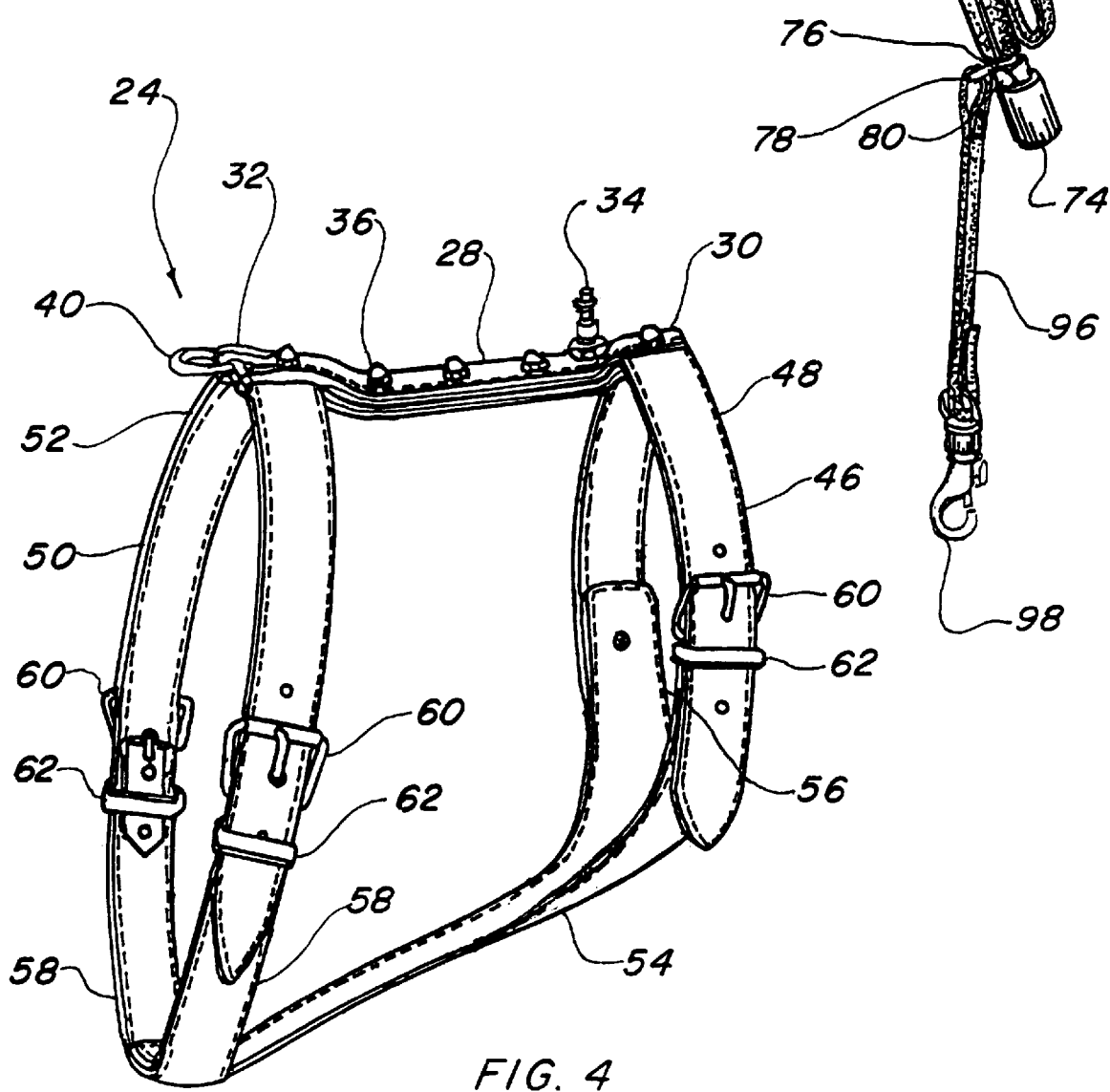
FIG. 4 is a partial isometric view of the harness assembly in the preferred embodiment.

The multi-layer construction includes at least one metal reinforcing bar 38 as illustrated best in FIGS. 7 and 8. The bar 38 has the same width and length as the remainder of the layers and has pre-punched holes to allow fasteners to pass through easily. The bar 38 is formed in the desired shape, which duplicates the approximate form of a dog's back. The forward end 30 of the bar 38 is upset slightly to accommodate the harness assembly 24, as illustrated in FIG. 4.

The shoulder connecting member 28 includes a D-ring 40 which is securely affixed to its rearward end 32 for attachment purposes, and the quick connect plug 34 is secured to the connecting member 28 with a threaded fastener, which is not shown as it is located between the layers of the connecting member. The quick disconnect plug 34 is constructed of metal and consists of a male stem 42 with a circumferential jaw 44, as depicted in FIG. 7.

The harness assembly 24 includes a neck band 46 that encircles the dog's neck and is in two separate sections, with the upper section 48 attached at an upper end to the shoulder connecting member 28 on the forward end 30. The harness assembly 24 also has a similar body band 50 that encircles the dog's body behind its front legs, as illustrated in FIG. 1. The body band 50 is also in two separate sections, with the upper section 52 similarly attached at an upper end to said shoulder connecting member 28 on the rearward end 32.

A chest member 54 is positioned on the dog's underside which completes the harness assembly 24. This chest member 54 is connected on a first end to the neck band 46, thus forming the neck band lower section 56, and on a second end to the body band 50, likewise forming the body band lower section 58. The chest member is illustrated in the flat in FIG. 9 and 10, and includes a pair of buckles 60 and keepers 62 that are attached directly to the chest member's first and second ends, which are in fact the lower section of the neck band and body band 56 and 58 respectively. The neck band 46 and body band 50 both have conventional mating holes that interface with the buckles 60 and, when attached together, complete the encircling neck band 46 and body band 50.

The harness assembly 24 is preferably fabricated of leather, as illustrated in the drawings, however other types of materials may be use with equal ease, such as webbing or thermoplastic sheets cut into strips to form the straps of the assembly. It should also be noted that the harness assembly 24 may be configured differently and still be within the scope of the invention. As long as the quick-disconnect function is included, there are many and varied harness designs that could easily replace the preferred form.

Figure 2:
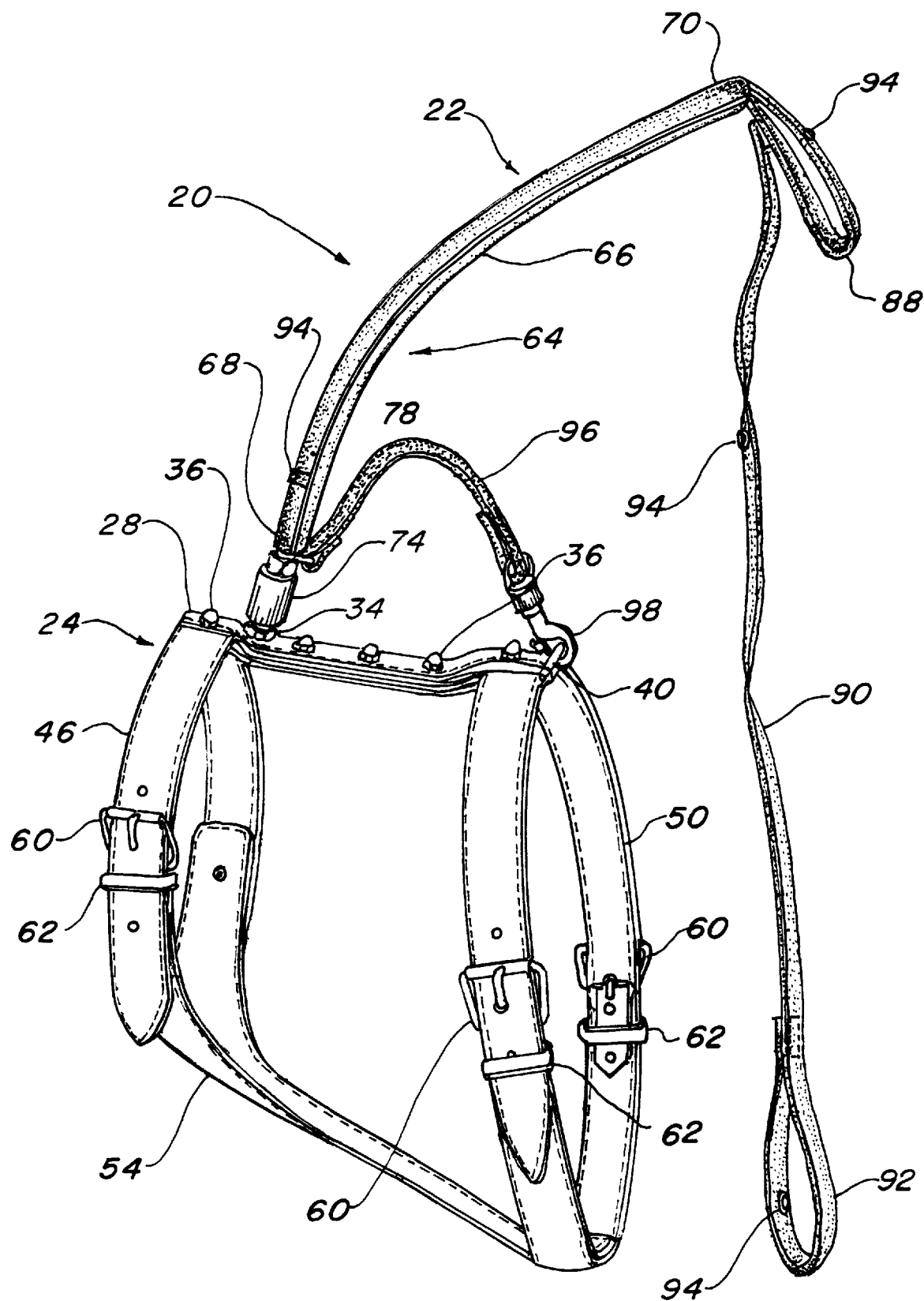
FIG. 2 is a partial isometric view of the preferred embodiment of the pet harness with quick-connect stand-up leash with the extended leash folded in its stowed position.
Figure 3:
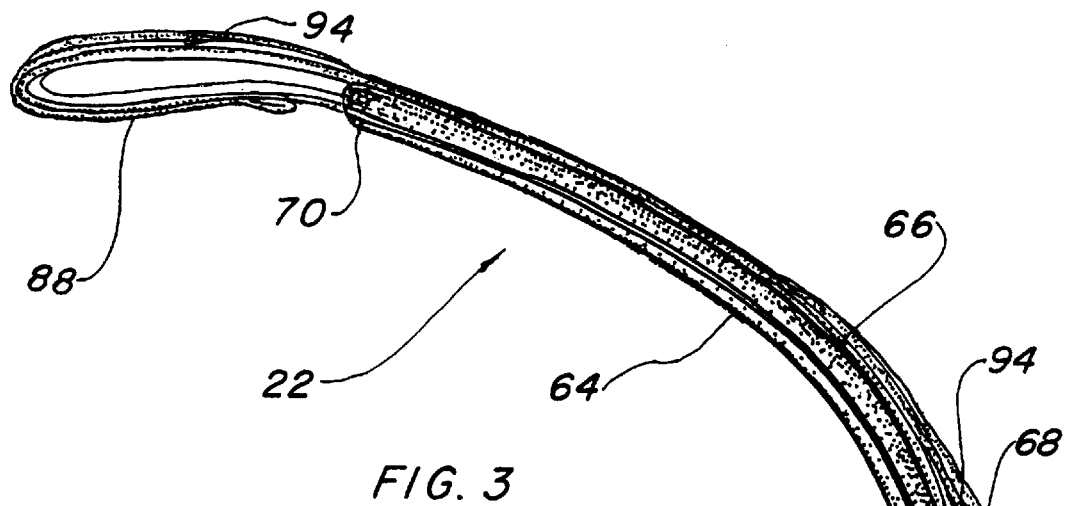
FIG. 3 is a partial isometric view of the stand-up leash assembly in the preferred embodiment.

A stand-up leash 64 is attached to the harness assembly shoulder connecting member 28 that rests on the dog's back and customarily remains standing in an upright position, as illustrated in FIGS. 1 and 2. The stand up leash 64 consists of a semi-rigid leash arm 66 that is formed in a radial shape, with a connecting end 68 and a distal end 70. The leash arm 66 has a length that positions the distal end 70 at a convenient location for a person walking alongside the dog to have a comfortable grasp on the leash 64. The leash arm 66 preferably consists of a round rubber rod 72, however this material may be substituted with a thermoplastic rod or even a metallic extension spring. In the preferred embodiment the leash arm 66 is covered with leather, however woven webbing or thermoplastic may be utilized for the cover as well.

The stand-up leash 64 includes a quick-connect coupling 74, which is located on the connecting end 68, and is configured in such manner that the coupling 74 interfaces with the quick-connect plug 34 on the shoulder connecting member 28, thereby permitting straightforward and positive removal and replacement of the stand-up leash 64 from the harness assembly 24. A metallic threaded stud 76 interfaces with the coupling 74 on the first end and is attached to the leash arm inner body rubber rod 72 on the second end. A connecting ring 78 is disposed around the stud 76 between the coupling 74 and the arm 66 for attachment purposes. The quick-connect coupling 74 includes a coupling member 80 that is secured on a connecting end 68 of the leash arm 66. The quick-connect coupling 74 is formed from metal and has an outer sliding sleeve 82 and a plurality of ball locks 84 on an inner sleeve 86, which are configured to receive the male quick connect plug 34. The male plug 34 has the circumferential jaw 44 on the stem 42 which permits disconnection by manually sliding the outer sleeve 82 away from the inner sleeve 86, thereby releasing the grasp on the plug circumferential jaw 44.

The stand-up leash 64 has an integral hand grip 88 on the distal end 70 for ease of gripping and holding the dog wearing the harness, by a person controlling the animal's movements. The stand-up leash hand grip 88 is preferably formed from an extension of the material covering the leash arm 66, as illustrated in FIGS. 2, 3 and 11–13.

A stand-up leash extension 90 is included, which also has a leash extension hand grip 92, that is snapped onto the leash arm 66 for lengthening the leash 64 and providing increased freedom of movement for the dog. The stand-up leash extension hand grip 92 is integrally formed on the distal end of the leash extension 90. Snap-on attachment means 94 are included for coupling the leash extension 90 to the stand-up leash arm 66 and leash hand grip 92 in a stowed position, thus permitting convenient storage of the leash extension 90 when not in use.

A safety strap 96 having a loop on a first end is attached to the stand-up leash arm 66 around the connecting ring 78. A snap-hook 98 is permanently attached onto a second end of the strap 96, with the snap-hook 98 joined to the shoulder connecting member D-ring 40, which guarantees that the connection between the leash 64 and the harness assembly 24 is not breached. The safety strap 96 is illustrated in FIGS. 1 and 2 in its connected configuration, and FIGS. 3 and 11 disconnected from the harness assembly 24.

The stand-up leash 64, leash extension 90 and safety strap 96 are preferable fabricated of leather, however other substances such as webbing or thermoplastic are an acceptable substitute.

During use, the harness assembly 24 is attached to the dog's body, as illustrated in FIG. 1, using the buckles 60 and keepers 62 to achieve a snug and yet comfortable fit. The leash assembly 22 is attached to the quick connect plug 34 with the connector coupling 74 by pulling upward on the outer sliding sleeve 82 while inserting it over the male stem 42 until the ball locks 84 snap over the jaw 44. When walking the dog, the owner will grasp the leash assembly 22 by the hand grip 88 and therefore have complete control. When more freedom for the dog is required during a walk, the leash extension 90 may be unstrapped and the owner may grasp the extended hand grip 92. For short periods of time the dog may be released and the leash assembly 22 left in its upright position, or for extended periods the leash 22 is simply removed by disconnecting the coupling 74 and unsnapping the snap hook 98 on the safety strap 96.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. An animal harness comprising:
    a) a harness assembly having:
        (1) a shoulder connecting member which rests on an animal's back and is defined with a forward end and a rearward end, with a quick connect plug extending angularly upward, essentially adjacent to the forward end,
        (2) a neck band encircling the animal's neck and attached at a top end to said shoulder connecting member,
        (3) a body band encircling the animal's body behind the animal's front legs and attached at a top end to said shoulder connecting member, and
        (4) a chest member located on the animal's underside and connected on a first end to said neck band and on a second end to said body band, thus completing the animal harness assembly,
    b) a stand-up leash attached to said harness assembly shoulder connecting member which rests on the animal's back, said stand up leash normally remaining attached in an upright position and having:
        (1) a semi-rigid stand-up leash arm formed into a radial shape having a connecting end and a distal end, with a length that positions the distal end at a convenient location for a person walking alongside an animal wearing the harness to comfortably grasp the leash,
        (2) a quick connect coupling located on the connecting end and configured such that the coupling interfaces with said quick connect plug on the shoulder connecting member in order to easily remove and replace the stand-up leash from said harness assembly, and
        (3) a stand-up leash extension including a stand-up leash extension hand grip snapped onto the leash arm for lengthening the leash which permits the animal increased freedom of movement.

2. The animal harness as recited in claim 1 wherein the distal end of said stand-up leash further comprises an integral leash hand grip for ease of gripping and holding an animal wearing the harness by a person controlling the animal's movements.

3. The animal harness as recited in claim 2 wherein said shoulder connecting member comprises a multi-layer construction having a plurality of layers, with each layer the same width and attached together with fasteners to create a structurally sturdy member which is capable of retaining its shape when subjected to forces created by an animal's movements.

4. The animal harness as recited in claim 3 wherein said multi-layer construction includes at least one metal reinforcing bar as a specific layer.

5. The animal harness as recited in claim 3 wherein said shoulder connecting member further comprises a D-ring which is securely affixed to said rearward end for attachment purposes.

6. The animal harness as recited in claim 3 wherein said shoulder connecting member further comprises a quick disconnect plug which is secured to the connecting member with a threaded fastener, said quick disconnect plug formed from metal having a male stem with a circumferential jaw configured to mate with said quick connect coupling in order to permit disconnection by manipulation of the coupling, thus releasing the grasp on the plug jaw.

7. The animal harness as recited in claim 2 wherein said neck band encircling an animal's neck further comprises a pair of buckles and keepers which are attached to the chest member, and said neck band having mating holes to interface with the buckles, thereby forming the encircling neck band.

8. The animal harness as recited in claim 2 wherein said body band encircling the animal's neck further comprises a pair of buckles and keepers attached to the chest member, and said body band having mating holes to interface with the buckles, thereby forming the encircling body band.

9. The animal harness as recited in claim 2 wherein said harness assembly is fabricated of a material selected from the group consisting of leather, webbing and thermoplastic.

10. The animal harness as recited in claim 2 wherein said stand-up leash arm having a body within made of a material selected from the group consisting of a rubber rod, a thermoplastic rod and a metallic extension spring.

11. The animal harness as recited in claim 10 wherein said stand-up leash arm is covered with material selected from the group consisting of leather, woven webbing and thermoplastic.

12. The animal harness as recited in claim 10 wherein said stand-up leash hand grip is formed from an extension of the material covering the leash arm.

13. The animal harness as recited in claim 2 wherein said quick connect coupling which is attached to the connecting end of the stand-up leash further comprises a metallic threaded stud threadably interfacing with the coupling on a first end and attached to the leash arm body on the second end, and a connecting ring disposed around the stud therebetween for attachment purposes.

14. The animal harness as recited in claim 2 wherein said stand-up leash quick connect coupling further comprises a coupling member which is secured on the connecting end of the leash arm, said quick connect coupling formed from metal having an outer sliding sleeve and a plurality of ball locks on an inner sleeve configured to receive the male plug, said male plug having a circumferential jaw which permits the disconnection by manually sliding the outside sleeve away from the inner sleeve, thus releasing the grasp on the plug circumferential jaw.

15. The animal harness as recited in claim 2 wherein said stand-up leash extension hand grip is integrally formed on the distal end of the leash extension.

16. The animal harness as recited in claim 2 wherein said stand-up leash extension further comprises a snap-on attachment means for coupling said leash extension to said stand up leash arm and leash hand grip, in a stowed position permitting convenient storage of the leash extension when not in use.

17. The animal harness as recited in claim 2 wherein said stand-up leash extension is fabricated of a material selected from the group consisting of leather, webbing and thermoplastic.

18. The animal harness as recited in claim 2 further comprising a safety strap having a loop on a first end for attachment to said stand up leash arm and a snap-hook attached upon a second end for joining with said shoulder connecting member, thereby providing a safety strap for assuring that the connection therebetween is not breached.

\* \* \* \* \*